(12) United States Patent
Joyce et al.

(10) Patent No.: US 6,934,533 B2
(45) Date of Patent: Aug. 23, 2005

(54) VOUCHER REDEMPTION IN MOBILE NETWORKS

(75) Inventors: Dennis P. Joyce, Rochester, NY (US); Michael J. Sutter, Piffard, NY (US); Morton F. Buchanan, Decatur, GA (US)

(73) Assignee: Nortel Networks Limited, St. Laurent (CA)

( * ) Notice: Subject to any disclaimer, the term of this patent is extended or adjusted under 35 U.S.C. 154(b) by 736 days.

(21) Appl. No.: 09/870,004

(22) Filed: May 30, 2001

(65) Prior Publication Data

US 2002/0183046 A1 Dec. 5, 2002

(51) Int. Cl.[7] .............................................. H01S 4/00
(52) U.S. Cl. ..................... 455/414.1; 713/168; 713/201
(58) Field of Search ...................... 455/414.1; 713/168, 713/201

(56) References Cited

U.S. PATENT DOCUMENTS

| | | | |
|---|---|---|---|
| 5,855,007 A | 12/1998 | Jovicic et al. ................. | 705/14 |
| 6,012,039 A * | 1/2000 | Hoffmann .................... | 705/14 |
| 6,018,724 A * | 1/2000 | Arent .......................... | 705/44 |
| 6,035,280 A | 3/2000 | Christensen ................. | 705/14 |
| 6,223,291 B1 * | 4/2001 | Puhl et al. ................... | 713/201 |
| 6,463,534 B1 * | 10/2002 | Geiger et al. ................ | 713/168 |
| 6,542,740 B1 * | 4/2003 | Olgaard et al. ............. | 455/432 |

FOREIGN PATENT DOCUMENTS

| | | | |
|---|---|---|---|
| EP | 1077437 A2 | 2/2001 | ........... G07F/19/00 |
| EP | 1164529 A1 | 12/2001 | ........... G06F/17/60 |
| GB | 2353389 A | 2/2001 | ............. G07F/7/10 |
| WO | WO 94/24820 | 10/1994 | ........... H04N/7/087 |
| WO | WO 99/52051 | 10/1999 | ........... G06F/17/60 |
| WO | WO 00/39657 | 7/2000 | |
| WO | WO 00/41121 | 7/2000 | ........... G06F/19/00 |
| WO | WO 00/42583 | 7/2000 | ............ G07G/1/12 |
| WO | WO 00/68858 | 11/2000 | ........... G06F/17/60 |
| WO | WO 01/14954 A2 | 3/2001 | ............. G06F/1/00 |

OTHER PUBLICATIONS

European Search Report for EP 02253482.0 published Mar. 31, 2004.

* cited by examiner

*Primary Examiner*—Creighton Smith
(74) *Attorney, Agent, or Firm*—Withrow & Terranova, PLLC

(57) ABSTRACT

The present invention supports transfer of a voucher to a mobile terminal wherein the voucher is associated with and redeemed at a retailer using the mobile terminal. Redemption of the voucher requires the mobile terminal to interact with a retailer's transaction system. Preferably, the voucher includes or is associated with a value and description information pertaining to a related product or service. The voucher is authenticated in a secure fashion to ensure redemption occurs according to the issuer's specification.

19 Claims, 5 Drawing Sheets

VOUCHER REDEMPTION IN MOBILE NETWORKS

FIELD OF THE INVENTION

The present invention relates to providing and redeeming vouchers, and in particular, providing and redeeming vouchers using a mobile terminal.

BACKGROUND OF THE INVENTION

Given the increasing acceptance and functionality provided by mobile terminals, such as mobile telephones and wireless personal digital assistants (PDAs), there is an increasing need to provide the users of such mobile terminals with enticements in the form of vouchers for product and services. These vouchers may represent electronic coupons and the like to provide discounts, or may represent payment for any number of products and services. Voucher distributors prefer that vouchers providing coupons of significant value or complete payment be limited in use to the intended recipient. Unfortunately, it has proven difficult to ensure that the authorized recipient is the one redeeming the voucher. When in electronic form, there is further difficulty in preventing illegal duplication and subsequent distribution of electronic vouchers.

As such, there is a need for an efficient way to distribute and redeem vouchers in a manner ensuring the authorized recipient redeems the voucher as the distributor of the voucher intended.

SUMMARY OF THE INVENTION

The present invention supports transfer of a voucher to a mobile terminal wherein the voucher is associated with and redeemed at a retailer using the mobile terminal. Redemption of the voucher requires the mobile terminal to interact with a retailer's transaction system. Preferably, the voucher includes or is associated with a value and description information pertaining to a related product or service. The voucher is authenticated in a secure fashion to ensure redemption occurs according to the issuer's specification.

Typically, a service provider will create a voucher message including information relating to or representing a voucher. Authentication information, such as a digital certificate, is associated with the voucher message. The voucher message is preferably encrypted using a private key associated with the digital certificate and sent to a select mobile terminal via a wireless communication network.

Upon receipt, the mobile terminal may process the voucher message to recover the voucher information and use the digital certificate or other authentication technique to authenticate the voucher message or voucher information. To redeem the voucher, the mobile terminal will either transmit or otherwise provide the voucher information to a retailer's transaction interface. The voucher indicia may be transmitted using direct, radio frequency, optical, or like communication techniques. Alternatively, the mobile terminal may display the voucher information for reading by the transaction interface. The transaction interface will cooperate with other retailer equipment and remote services to effect the transaction and redeem the voucher.

Preferably, the voucher message is created with limitations on use that are carried out by the mobile terminal. For example, the voucher message may contain information limiting the number of times the voucher indicia may be redeemed, a time frame in which to redeem the voucher indicia, or a combination thereof. The limitation information may be provided by the authentication information, such as the digital certificate, the voucher information, or other information provided with the voucher message. Further, messages may be provided in or associated with the voucher message that are directed to the user to provide instructions or other information pertaining to the voucher, such as products or services of the voucher, instructions for redemption, places for redemption, and the like.

Additional information may be provided with the voucher indicia to facilitate tracking and merchandizing. For example, the time, date, or location where the voucher was received and redeemed may be gathered by the mobile terminal and transmitted during redemption. The information may include additional demographics, the type of mobile terminal, or subscriber identification, such as the name of the subscriber, or Mobile Station Integrated Services Data Network (MSISDN) information and the like.

The present invention provides a reliable and secure way to ensure that vouchers are properly used without unauthorized duplication.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The present invention supports transfer of a voucher to a mobile terminal wherein the voucher is associated with the mobile terminal. Redemption of the voucher requires the mobile terminal to interact with a retailer's transaction system. Preferably, the voucher includes or is associated with a unit value and description information pertaining to a related product or service. The voucher is authenticated in a secure fashion to ensure that redemption occurs according to the issuer's specification.

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
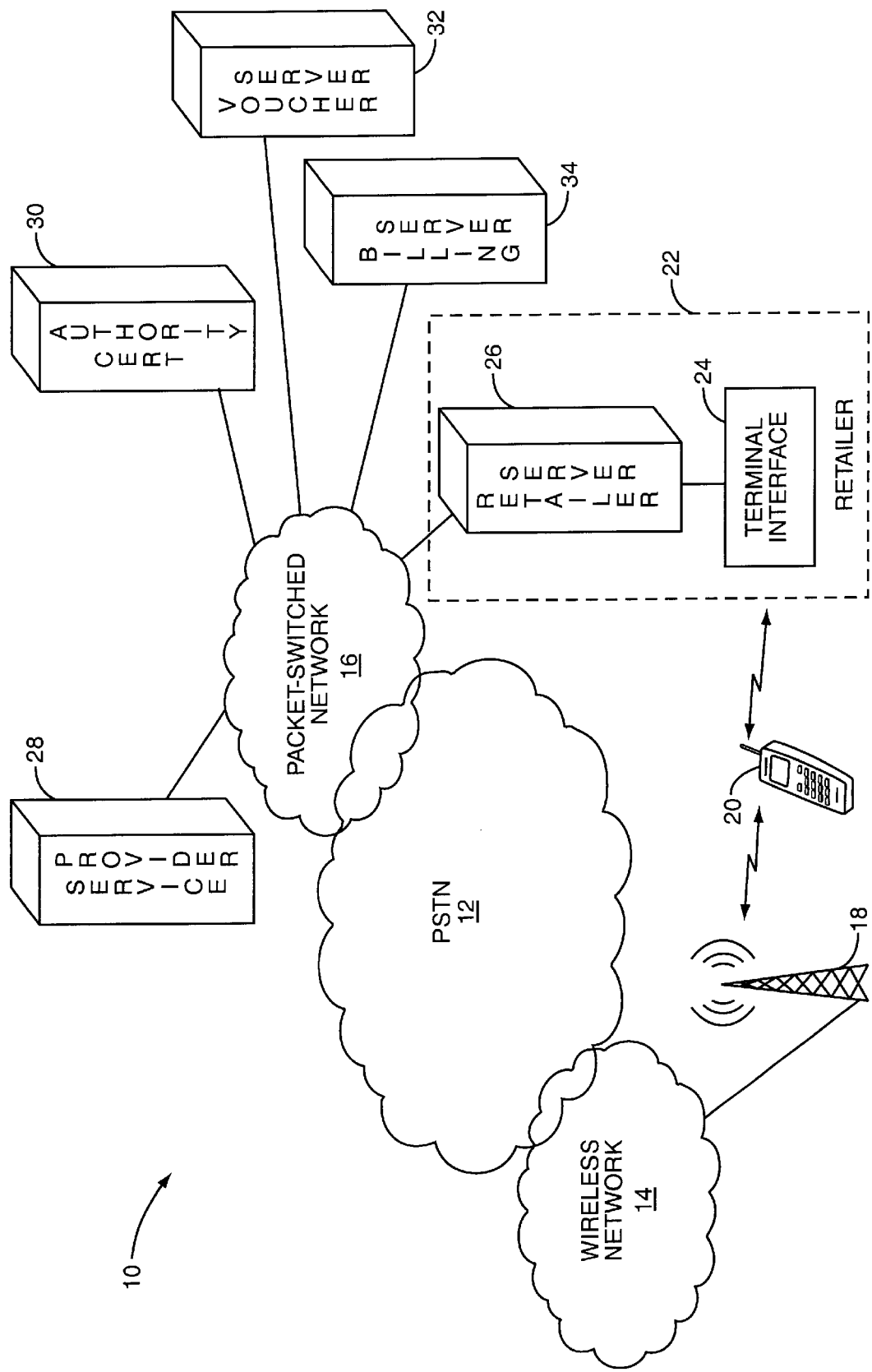
FIG. 1 is a block representation of a communication environment according to a preferred embodiment of the present invention.

Turning now to FIG. 1, a communication environment generally referenced as 10 is shown according to one embodiment of the present invention. Typically, the public switched telephone network (PSTN) 12 connects a wireless communication network 14 and a packet-switched network 16, such as the Internet. In traditional fashion, the wireless communication network 14 will include the requisite mobile switching centers (not shown) capable of cooperating with a base station 18 to facilitate wireless communications with a mobile terminal 20, such as a mobile telephone or personal digital assistant (PDA).

For the present invention, vouchers are effectively delivered to the mobile terminal 20 from the packet-switched network 16 via the wireless communication network 14. As noted, the mobile terminal 20 will effectively communicate with or otherwise make information available to a retailer 22 via a terminal interface 24. Information may be retrieved from the mobile terminal 20 via the terminal interface 24 using direct electrical, radio frequency, optical, or like communication technique. As will be described in further detail below, a mobile telephone may transmit electrical, radio frequency, or optical signals to the terminal interface 24, or may display indicia capable of being read by the terminal interface 24. Those skilled in the art will recognize the many available techniques for retrieving information from the mobile terminal 20 via the terminal interface 24.

The terminal interface 24 will generally communicate with a retailer server 26 for processing a transaction associated with voucher redemption, as well as communicate with any necessary systems over the packet-switched network 16 to facilitate voucher redemption, billing, and the like.

Figure 2:
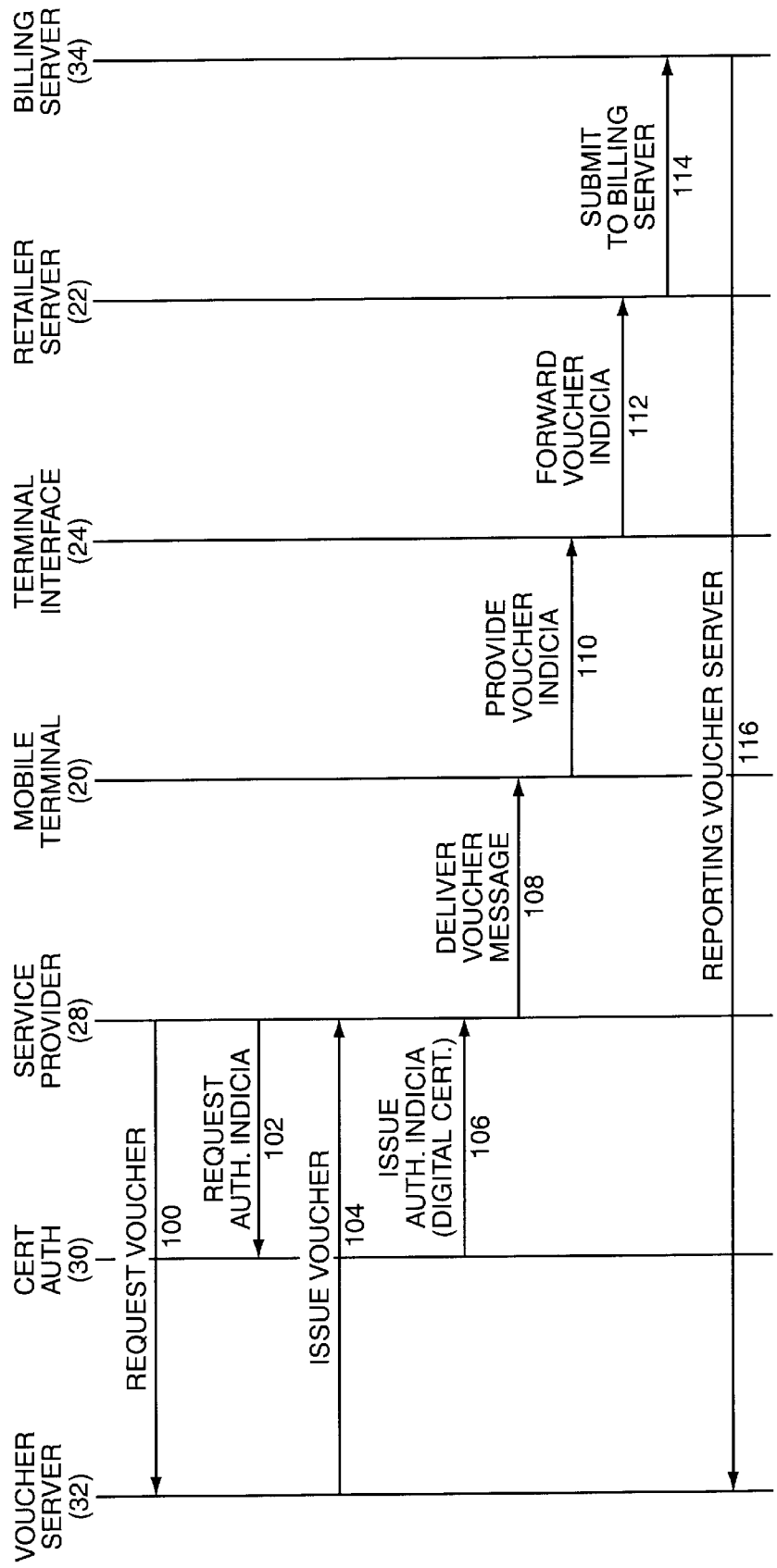
FIG. 2 is a communication flow diagram representing an exemplary operation according to the preferred embodiment of the present invention.

The packet-switched network 16 may support a service provider 28, a certificate authority 30, a voucher server 32, and a billing server 34, among any number of other systems and services. The service provider 28 will preferably cooperate with the certificate authority 30 to receive authorization indicia, such as a digital certificate, and cooperate with a voucher server 32 to obtain an issued voucher. The service provider 28 will generally create a voucher message including authentication indicia and voucher indicia corresponding to the issued voucher, and send the voucher message to the mobile terminal 20. A typical provisioning and redemption scenario is outlined in the communication flow diagram of FIG. 2.

Initially, the service provider server 28 will initiate a request for a voucher from the voucher server 32 and a request for authentication indicia, such as a digital certificate, from the certificate authority 30 (steps 100 and 102). In response, the voucher server 32 will issue a voucher to the service provider 28 (step 104) and the certificate authority 30 will issue the authentication indicia (e.g. digital certificate) to the service provider 28 (step 106). The service provider 28 will then generate a voucher message sufficient to identify at least the essential information pertaining to the voucher and the authentication indicia. For the purposes of illustration, assume that the authentication indicia is a digital certificate containing a digital signature from the certificate authority 30 with a public key associated with the digital certificate, and preferably, corresponding to a private key used to encrypt all or a portion of the voucher message. Those skilled in the art are familiar with the use of digital certificates and the public/private key encryption and authorization system. Other authentication and encryption systems are applicable to the present invention.

Once the voucher message including voucher indicia and the requisite authentication is encrypted using the private key, the voucher message is delivered to the mobile terminal 20 (step 108). Delivery of the voucher message to the mobile terminal 20 may be facilitated using any number of currently available and future techniques. The voucher message may be delivered to the mobile terminal 20 via email, the short message service (SMS), wireless application protocol (WAP), a paging service, or the like. The delivery technique is not as important as the fact that the message is sent to and associated with a select mobile terminal 20. As will be discussed in greater detail below, the mobile terminal 20 will process the voucher message to recover the voucher indicia and use the authentication indicia or digital certificate to confirm authorization to use the voucher indicia.

Depending on whether encryption was used, the public key associated with the digital certificate is used to decrypt the voucher message, which was originally encrypted using the private key associated with the digital certificate. Upon recovery and authentication, the voucher indicia is provided to the terminal interface 24 for redemption in association with a transaction or like action (step 110).

As noted, the terminal interface 24 may receive the voucher indicia via direct electrical, radio frequency, or optical transmission from the mobile terminal 20, depending on the configuration of the respective devices. Alternatively, the mobile terminal 20 may provide the voucher indicia by displaying the indicia for reading by the terminal interface 24. For example, the mobile terminal 20 may be configured to display uniform product codes (UPCs) in numeric or bar code format capable of being read by the terminal interface 24 when configured for optical character or bar code reading.

Preferably, the voucher indicia is provided to the terminal interface 24 in a format ready for redemption by the terminal interface 24 and associated equipment in traditional fashion. As such, the terminal interface 24 will provide any preliminary processing and forward the voucher indicia to the retailer server 22 (step 112), which will forward the voucher indicia to the billing server 34 (step 114), and then cooperate with the billing server 34 to facilitate the transaction and any other network server or service to facilitate redemption of the voucher indicia and any necessary accounting in traditional fashion. The retailer server 22 will also report receipt of the voucher indicia to the voucher server 32 or any other desired server or service to finalize the processing of the voucher (step 116).

Figure 3:
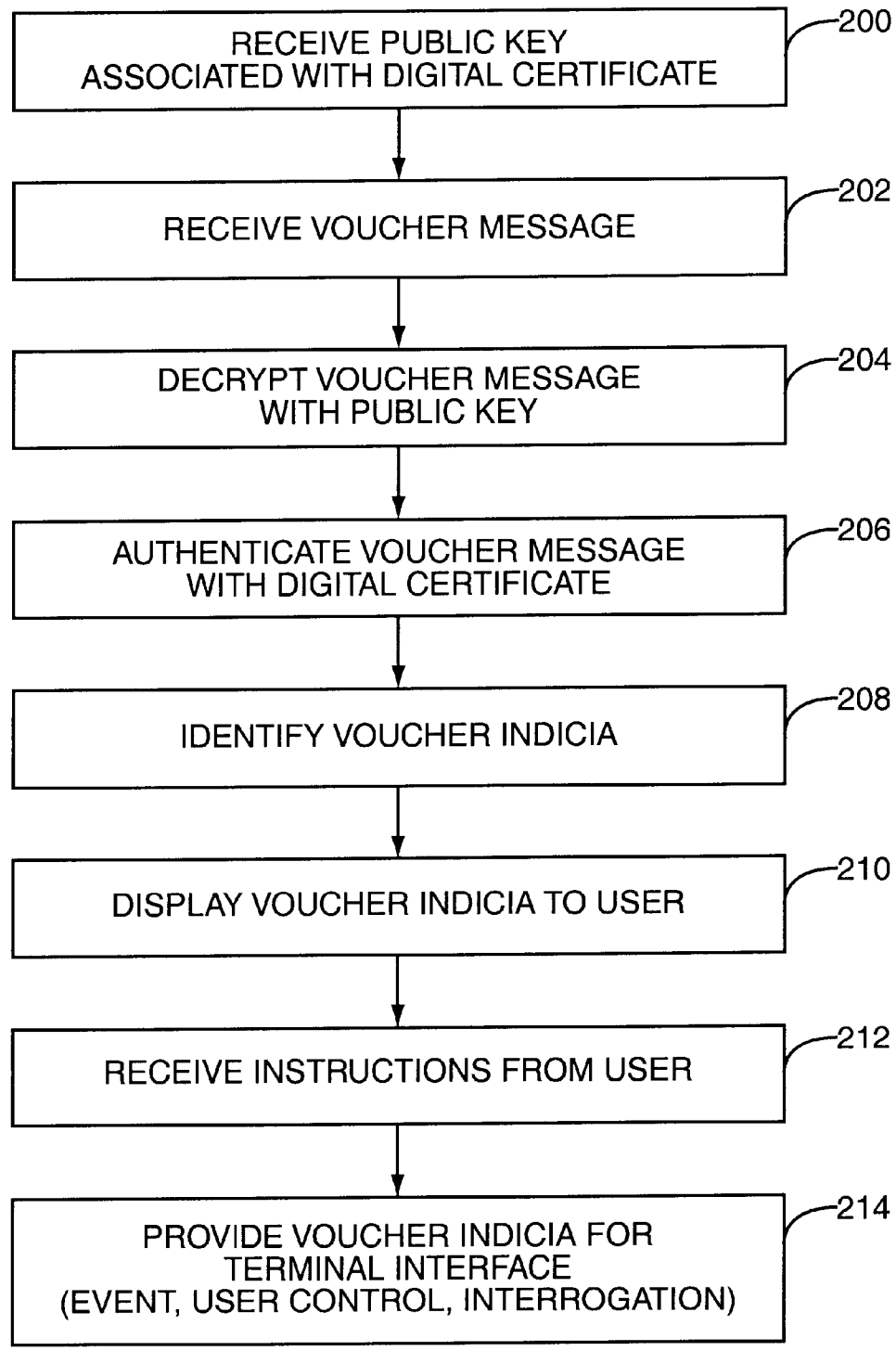
FIG. 3 is a flow diagram outlining a preferred process for operating a mobile terminal according to a preferred embodiment of the present invention.

The mobile terminal 20 may operate according to the process outlined in the flow chart of FIG. 3. Initially, the mobile terminal 20 will receive the public key associated with the digital certificate used to authenticate the voucher message (block 200). The public key will be used to decrypt the voucher message, which was preferably encrypted using the private key associated with the digital certificate. Any associated information sent to the mobile terminal 20 before or after receipt of the voucher message and associated with the voucher message that was encrypted with the public key will be decrypted using the public key. Next, the mobile terminal 20 will receive the voucher message from the service provider 28 via the various networks (block 202). Notably, the public key may be transmitted with the digital certificate as part of the voucher message. Further, the voucher message may be received with a digital certificate and then the mobile terminal 20 may access the certificate authority 30 to recover the public key associated with the digital certificate.

The voucher message will include information sufficient to either identify or represent the voucher. Thus, the voucher indicia may include information sufficient to allow the mobile terminal 20 to access information necessary for redemption of the voucher, or the voucher indicia may already include such information. Regardless of the scenario, the net effect is the same. Further, the voucher indicia may include information for displaying or playing to the user of the mobile terminal 20 for identifying the voucher, describing the goods or services for which the voucher pertains, explaining how to redeem the voucher, providing locations of retailers capable of accepting the voucher, or providing any other information desirable for presentation to the user in association with the voucher. Notably, this identification information may or may not be encrypted, instead the information may be readily displayed without decrypting or even checking authentication. As such, information may be provided to the user without recovering the actual voucher or representation thereof and checking authentication.

Typically, the voucher message is encrypted and the mobile terminal 20 will decrypt the voucher message with the public key when received (block 204). The mobile terminal 20 will then authenticate the voucher message using the digital certificate (block 206) and identify or recover the voucher indicia (block 208). The informative aspects of the voucher indicia may be displayed or played to the user (block 210). Further, the voucher indicia may include instructions for the mobile terminal 20 to query the user for instructions pertaining to use, acceptance, and the like. As such, the mobile terminal 20 may receive instructions from the user and function accordingly (block 212).

Finally, the voucher indicia is ultimately provided to the terminal interface 24 for redemption by transmitting the information to the terminal interface 24 to read or otherwise recover (block 214). The information may be provided for the terminal interface 24 based on any number of triggers. These triggers may include the occurrence of a select event, under direction of the user, or upon interrogation by a properly equipped terminal interface 24.

The voucher indicia will preferably set limitations on use. For example, the associated voucher may only be used one time and only within a select period of time. Alternatively, redemption of the voucher may have only a time limit and allow any number of transactions, or a set number of transactions within that time limit. A further option would be to allow only a select number of transactions, without any time limit. Those skilled in the art will recognize the various parameters for redemption of the voucher. Voucher indicia may provide links or otherwise direct access to more information pertaining to the voucher, the products or services associated with the voucher, the companies associated with the voucher, or how to use or redeem the voucher.

Additional information may be provided with the voucher indicia to the retailer to facilitate tracking and merchandizing. For example, the time, date, or location where the voucher was received and redeemed may be gathered by the mobile terminal and transmitted during redemption. The information may include additional demographics, the type of mobile terminal, or subscriber identification, such as the name of the subscriber, or Mobile Station Integrated Services Data Network (MSISDN) information and the like.

Figure 4:
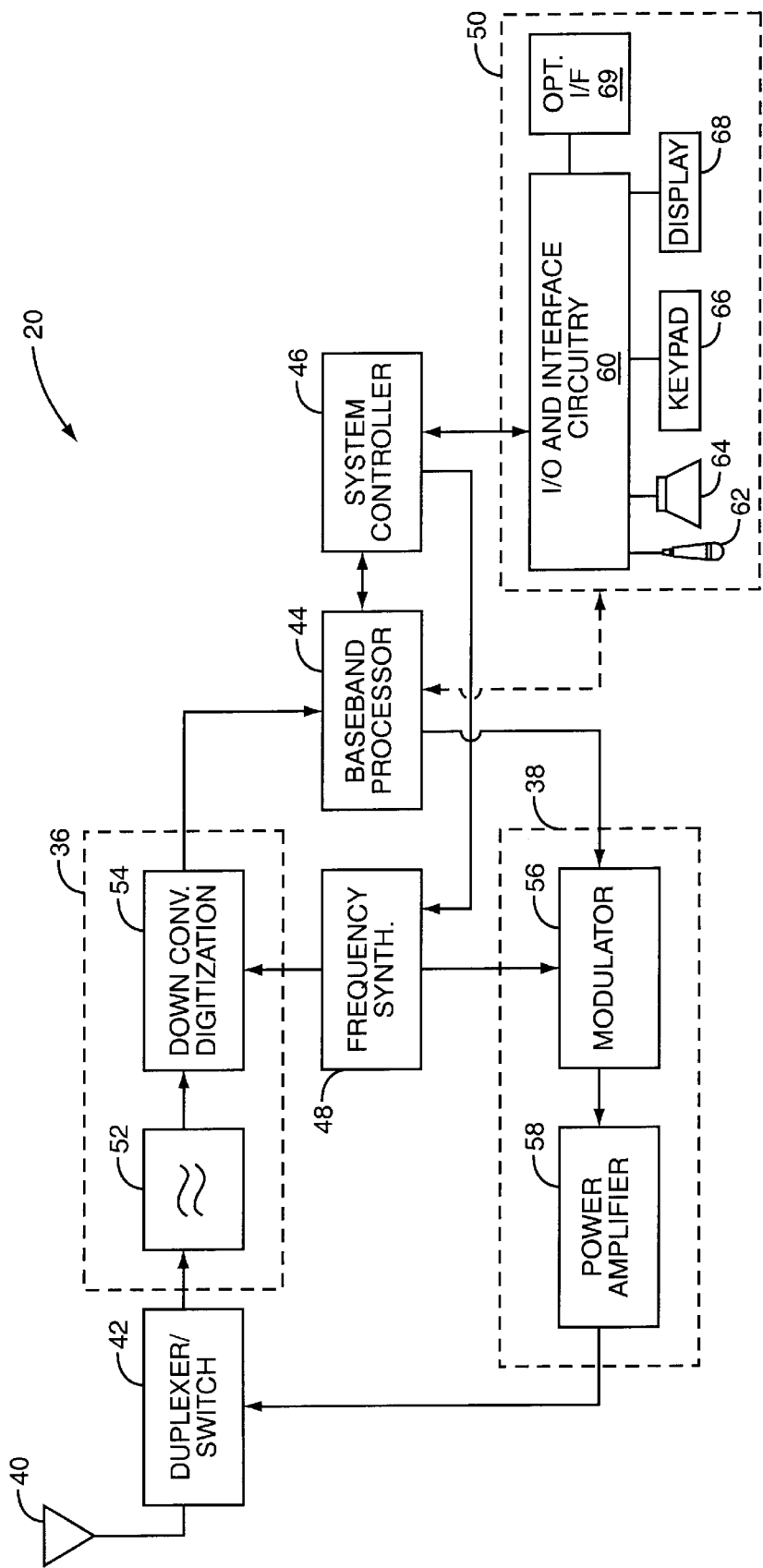
FIG. 4 is a block representation of a mobile terminal constructed according to a preferred embodiment of the present invention.

Although the mobile terminal 20 may take on many configurations, an exemplary mobile terminal 20 is represented in FIG. 4. The mobile terminal 20 may include a receiver front end 36, a radio frequency transmitter section 38, an antenna 40, a duplexer or switch 42, a baseband processor 44, a system controller 46, a frequency synthesizer 48, and an interface 50. The receiver front end 36 receives information bearing radio frequency signals from one or more remote transmitters provided by the base station 18. A filter circuit 52 minimizes broadband interference in the received signal, while a downconverter 54 downconverts the filtered, received signal to an intermediate or baseband frequency signal, which is then digitized into one or more digital streams. The receiver front end 36 typically uses one or more mixing frequencies generated by the frequency synthesizer 48.

The baseband processor 44 processes the digitized received signal to extract the information or data bits conveyed in the received signal. This processing typically comprises demodulation, decoding, and error correction operations. As such, the baseband processor 44 is generally implemented in one or more digital signal processors (DSPs).

On the transmit side, the baseband processor 44 receives digitized data from the system controller 46, which it encodes for transmission. The encoded data is output to the transmitter 38, where it is used by a modulator 56 to modulate a carrier signal that is at a desired transmit frequency. A power amplifier 58 amplifies the modulated carrier signal to a level appropriate for transmission from the antenna 40.

A user, or a device, such as the terminal interface 24, may interact with the mobile terminal 20 via the interface 50, which may include input/output (I/O) and interface circuitry 60 associated with a microphone 62, a speaker 64, a keypad 66, a display 68, and an optional interface 69. The I/O and interface circuitry 60 typically includes analog-to-digital converters, digital-to-analog converters, amplifiers, and the like. Additionally, it may include a voice encoder/decoder, in which case it may communicate directly with the baseband processor 44. The optional interface circuitry 69 may include radio frequency, optical, or direct electrical interfaces to facilitate any type of communication. For example, radio frequency communications may implement communications according to the Bluetooth standard or like IEEE 802.11 wireless communication standards. Optical communications may incorporate infrared technology.

The microphone 62 will typically convert audio input, such as the user's voice, into an electrical signal, which is then digitized and passed directly or indirectly to the baseband processor 44. Audio information encoded in the received signal is recovered by the baseband processor 44, and converted into an analog signal suitable for driving speaker 64 by the I/O and interface circuitry 60. The keypad 66 and display 68 enable the user to interact with the mobile terminal 20, input numbers to be dialed, address book information, or the like, as well as monitor call progress information.

Particularly useful for the present invention, the display 68 may be used for more data-intensive applications, such as providing messages and information using the short messaging service (SMS), paging, email, and the like. Messages may be sent to the mobile terminal 20 to indicate that vouchers are available, describe available vouchers, describe a voucher already sent, or provide any information related to accessing, providing, and redeeming vouchers according to the present invention. As noted, the display 68 may also be used to display indicia capable of being read by a properly equipped terminal interface 24.

Figure 5:
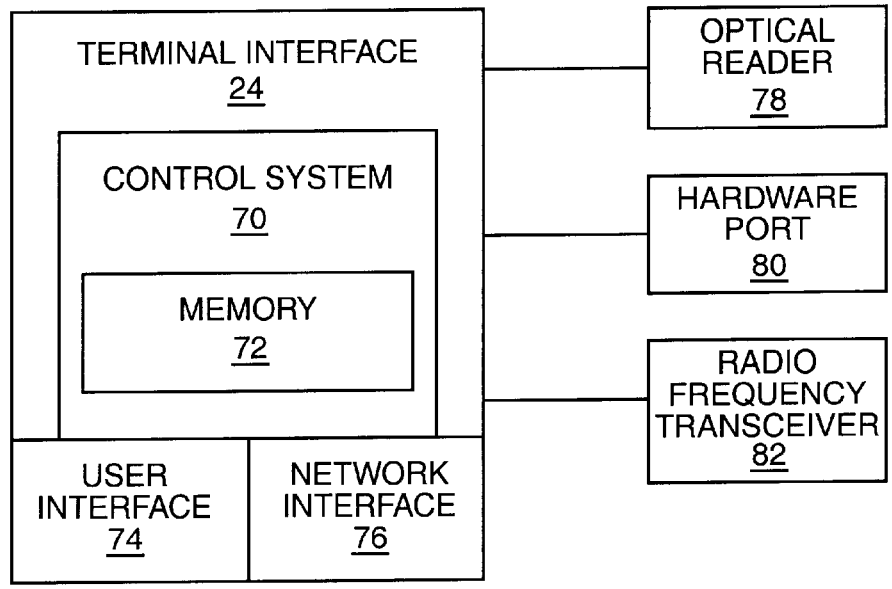
FIG. 5 is a block representation of a terminal interface constructed according to a preferred embodiment of the present invention.
Figure 6:
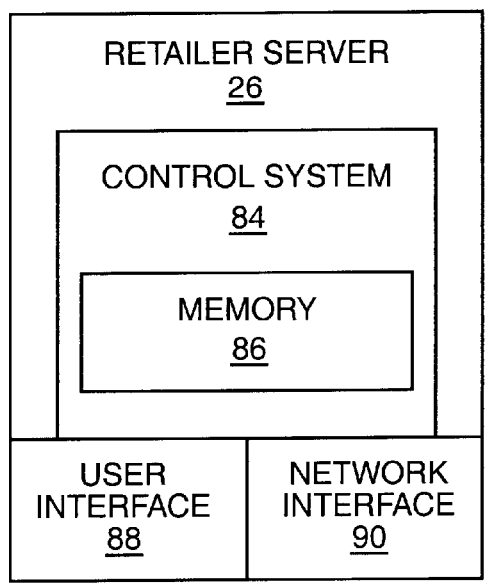
FIG. 6 is a block representation of a retailer server constructed according to a preferred embodiment of the present invention.
Figure 7:
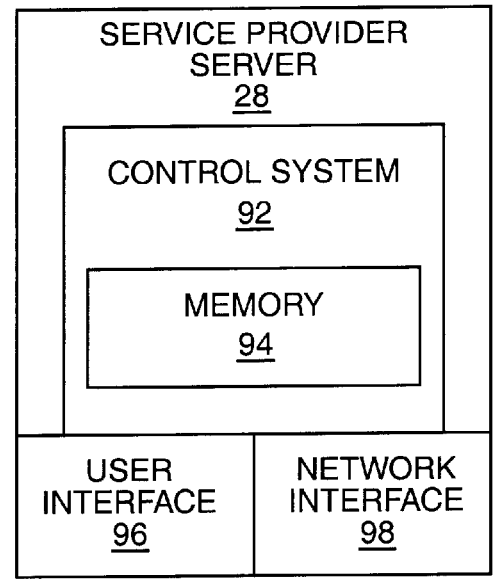
FIG. 7 is a block representation of a service provider server constructed according to a preferred embodiment of the present invention.

The terminal interface 24 may take on many configurations, including a point-of-sale configuration as depicted in FIG. 5. The terminal interface 24 may include a control system 70 with the necessary memory 72 containing the software and data necessary for operation of the terminal interface 24. The control system 70 is preferably associated with a user interface 74 and a network interface 76 facilitating communications with the retailer server 26 or the packet-switched network 16 directly or via a local area network (LAN). As noted, the terminal interface 24 may include a variety of communication devices, such as an optical reader 78, a hardware port 80 facilitating direct electrical communications, and a radio frequency transceiver 82 facilitating radio frequency communications. The terminal interface 24 may also take the form of a kiosk or like workstation capable of facilitating voucher redemption and preferably transactions for the retailer 22.

The retailer server 26 may be a typical web server or group thereof having a control system 84 with the requisite memory 86 containing the software and data necessary for operation. Control system 84 will include a user interface 88 and a network interface 90 facilitating communications with the packet-switched network 16. The service provider server 28 may represent a single server or group of servers having a control system 92 with memory 94 containing the requisite software and data necessary for operation. The control system 92 will include a user interface 96 and a network interface 98 for facilitating communications with the packet-switched network 16.

Those skilled in the art will recognize improvements and modifications to the preferred embodiments of the present invention. All such improvements and modifications are considered within the scope of the concepts disclosed herein and the claims that follow.

What is claimed is:

1. A mobile terminal for voucher redemption comprising:
   communication electronics facilitating wireless communications; and
   a control system associated with the communication electronics and adapted to:
     receive a voucher message including voucher indicia and associated authentication indicia from a service provider via the communication electronics;
     process the voucher message to identify the voucher indicia, wherein the voucher message includes a limitation on the use of the voucher indicia and the limitation on use includes at least a definition on a number of times the voucher indicia may be used; and
     provide the voucher indicia to a retailer for redemption.

2. The mobile terminal of claim 1 wherein at least a portion of the voucher message is associated with the mobile terminal.

3. The mobile terminal of claim 1 wherein the authentication indicia is a digital certification.

4. The mobile terminal of claim 3 wherein at least a portion of the voucher message is encrypted with a private key associated with the digital certificate, the control system adapted to decrypt the at least a portion of the voucher message with a public key associated with the digital certificate.

5. The mobile terminal of claim 1 wherein the control system is further adapted to process the authentication indicia to authenticate at least a portion of the voucher message.

6. The mobile terminal of claim 1 wherein the number of times the voucher may be used comprises a number greater than one.

7. The mobile terminal of claim 1 wherein the limitation on use further defines a period in which the voucher indicia may be used.

8. The mobile terminal of claim 1 further comprising a display associated with the control system, which is configured to display information pertaining to the voucher message for viewing by a user of the mobile terminal.

9. The mobile terminal of claim 1 wherein further comprising second communication electronics adapted to cooperate with the control system to provide the voucher indicia to a retailer for redemption by one of the group consisting of direct, optical, and radio frequency communications.

10. The mobile terminal of claim 1 wherein the control system is further adapted to:
    a) receive a first message relating to the voucher message; and
    b) request the voucher indicia from the service provider via the communication electronics wherein the voucher message will be provided in response to the request for the voucher indicia.

11. The mobile terminal of claim 1 wherein the control system is further adapted to provide additional information in addition to the voucher indicia to the retailer, the additional information pertaining to the mobile terminal or subscriber for the mobile terminal.

12. A mobile terminal for voucher redemption comprising:
    communication electronics facilitating wireless communications;
    a control system associated with the communication electronics and adapted to;
      receive a voucher message including voucher indicia and associated authentication indicia from a service provider via the communication electronics;
      process the voucher message to identify the voucher indicia; and
      provide the voucher indicia to a retailer for redemption
    a display associated with the control system, which is configured to display information sufficient to allow a retailer interface of the retailer to read the voucher indicia.

13. The mobile terminal of claim 12 wherein the information sufficient to allow the retailer interface of the retailer to read the voucher indicia includes one of the group consisting of a uniform product code, bar code, and character string capable of being read by an optical reader of the retailer interface.

14. A method for voucher redemption comprising:
    receiving voucher indicia;
    generating authentication indicia associated with the voucher indicia;
    creating a voucher message including the voucher indicia, and the associated authentication indicia wherein the voucher message includes a limitation on use of the voucher indicia, and wherein the limitation includes at a definition on a number of times the voucher indicia may be used; and sending the voucher message via a wireless communication network to a mobile terminal, which is capable of processing the voucher message to identify the voucher indicia and providing the voucher indicia to a retailer for redemption.

15. The method of claim 14 wherein the authentication indicia is a digital certificate.

16. The method of claim 15 further comprising encrypting at least a portion of the voucher message with a private key associated with the digital certificate, the mobile terminal adapted to decrypt the at least a portion of the voucher message with a public key associated with the digital certificate.

17. The method of claim 14 wherein the number of times the voucher may be used is a number greater than one.

18. The method of claim 14 wherein the limitation on use defines a period in which the voucher indicia may be used.

19. A method for voucher redemption comprising:

receiving voucher indicia;

generating authentication indicia associated with the voucher indicia;

creating a voucher message including the voucher indicia and the associated authentication indicia; and sending the voucher message via a wireless communication network to a mobile terminal, which is capable of processing the voucher message to identify the voucher indicia and providing the voucher indicia to a retailer for redemption the voucher message is created to facilitate the display of information on the mobile terminal sufficient to allow a retailer interface of the retailer to read the voucher indicia.

* * * * *